Nov. 1, 1966
L. R. McREYNOLDS
3,282,365
SELF-PROPELLED GOLF CART
Filed March 25, 1964
6 Sheets-Sheet 1
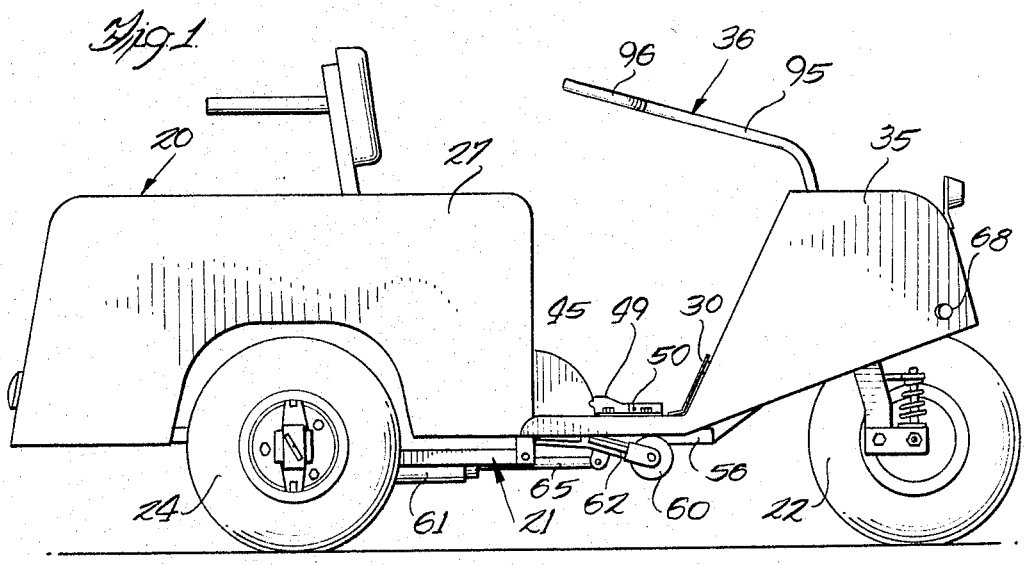
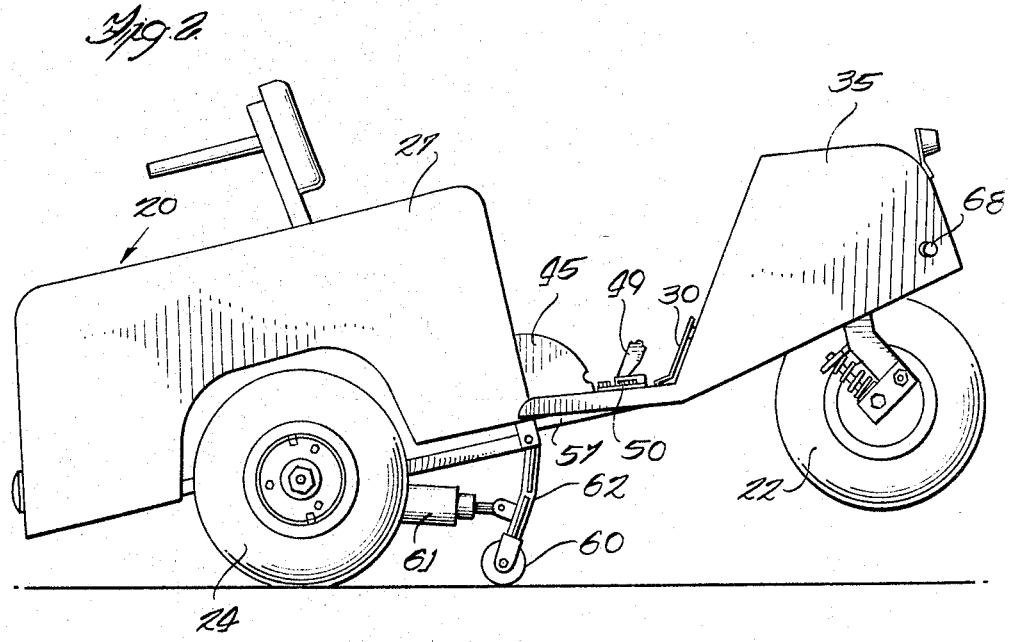
Inventor
Lowell R. McReynolds
Welsh and Bradway
Attorneys

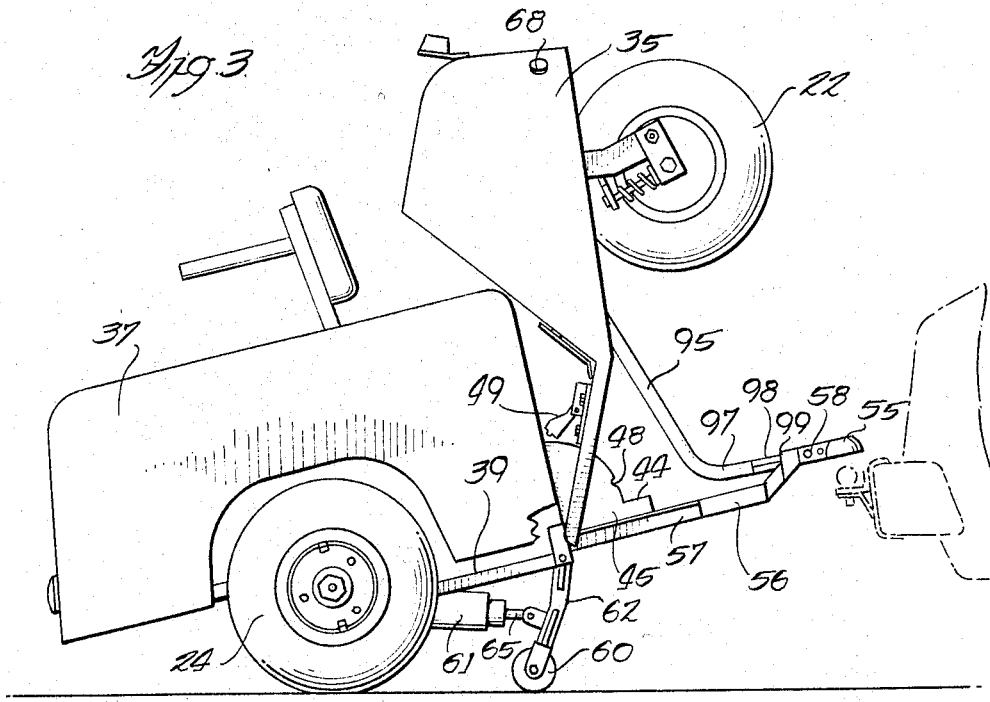
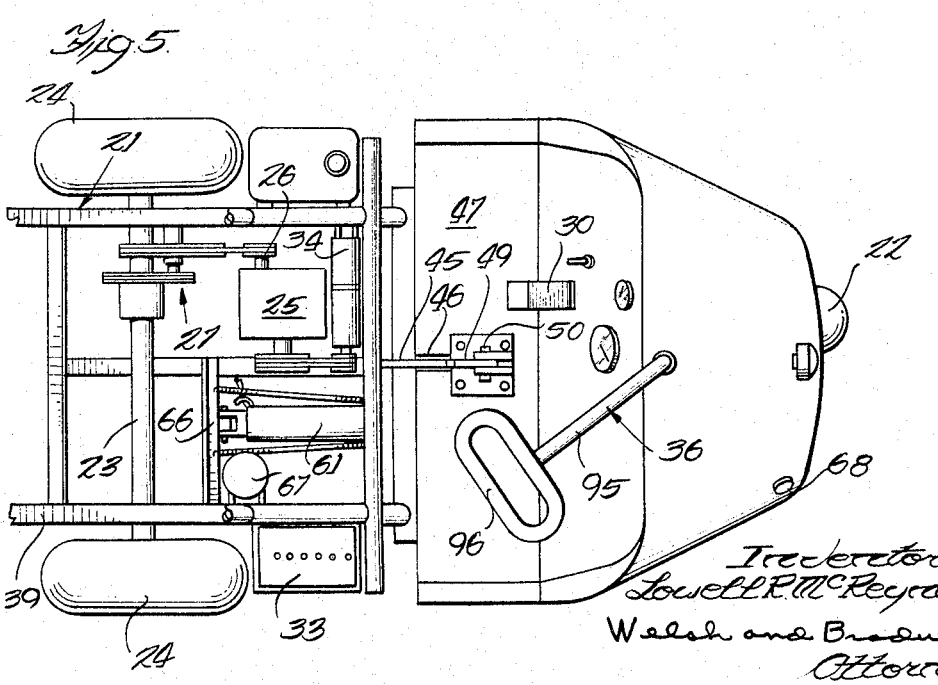

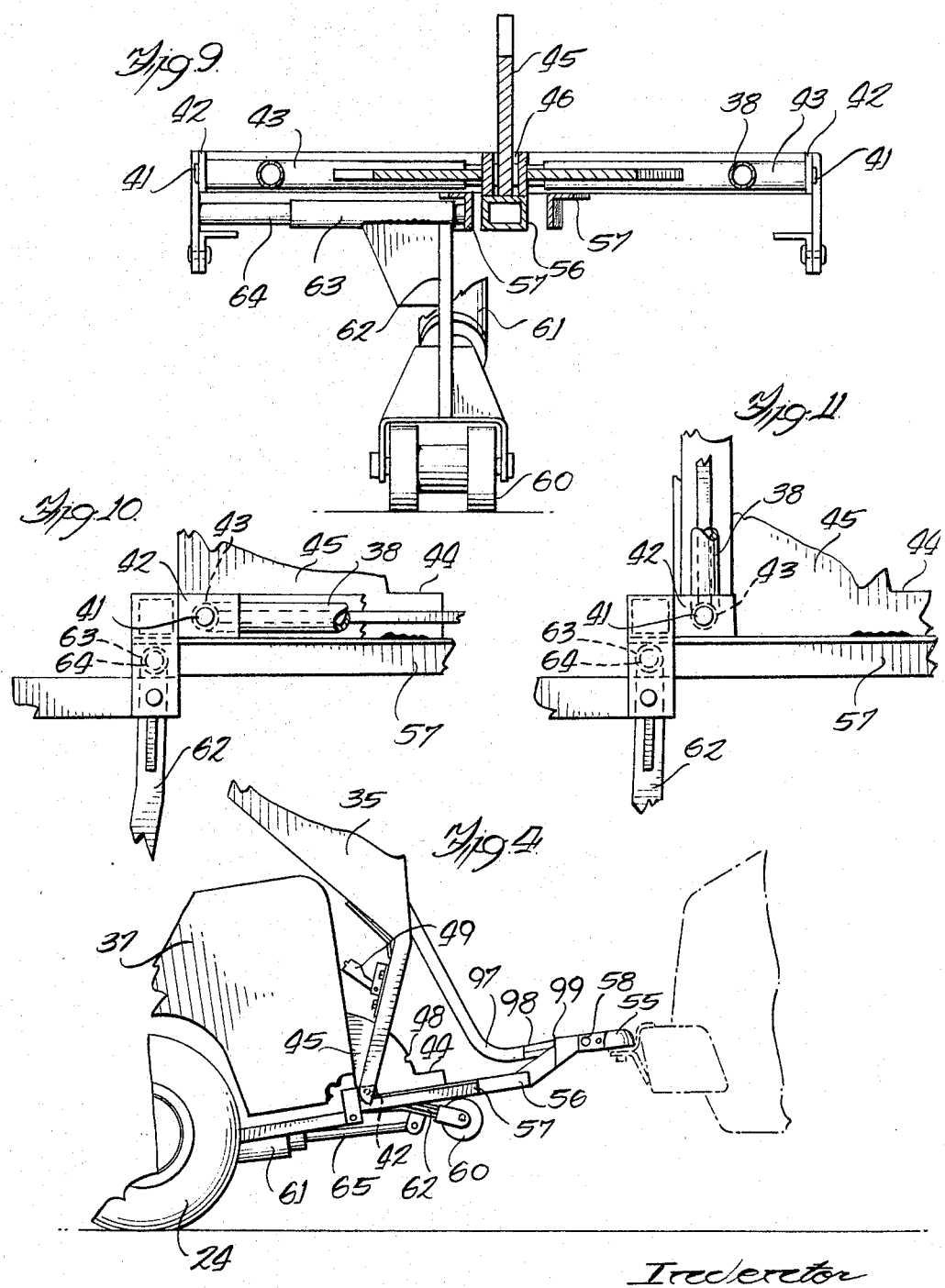

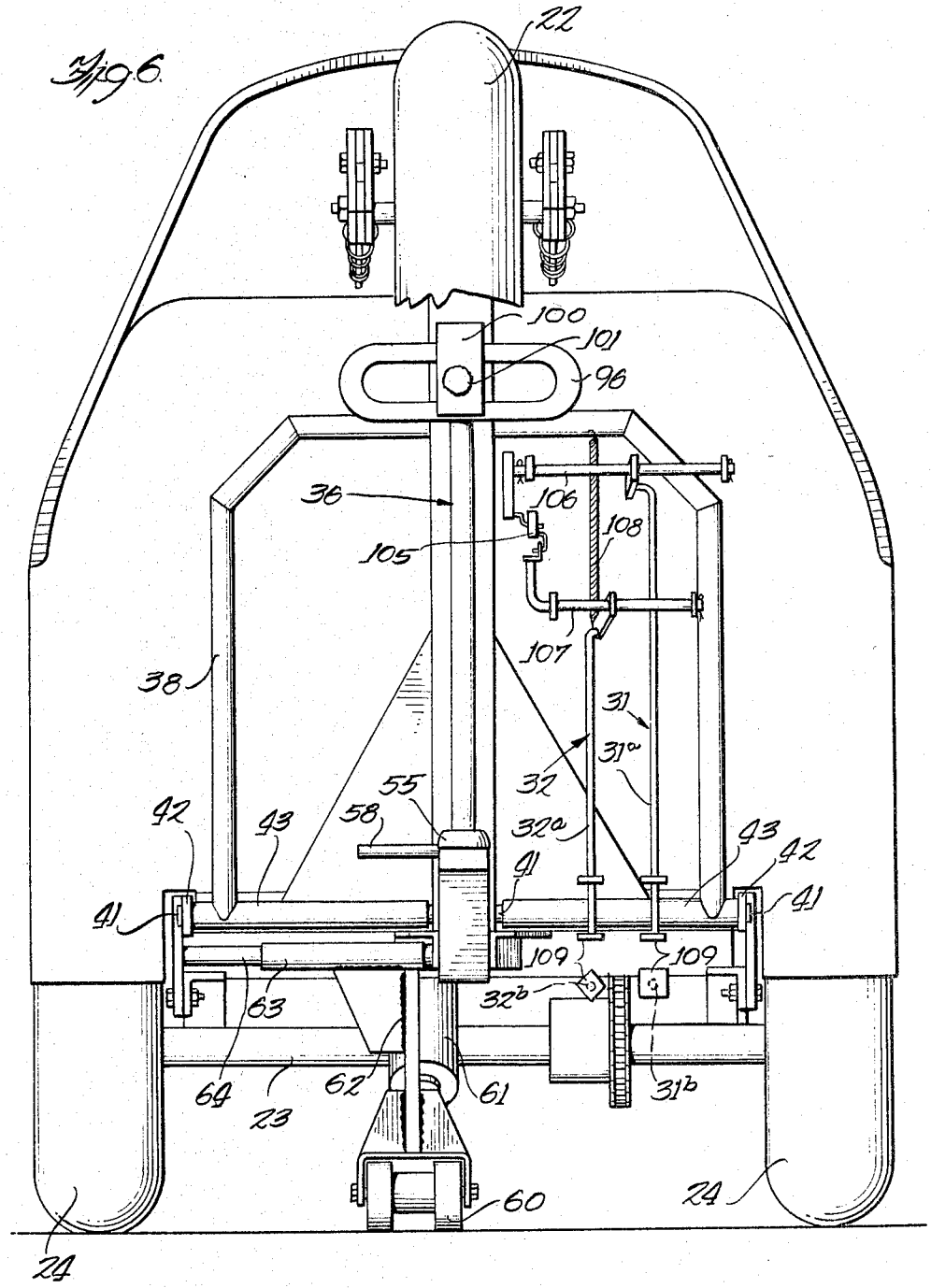

Nov. 1, 1966 L. R. McREYNOLDS 3,282,365
SELF-PROPELLED GOLF CART
Filed March 25, 1964 6 Sheets-Sheet 5
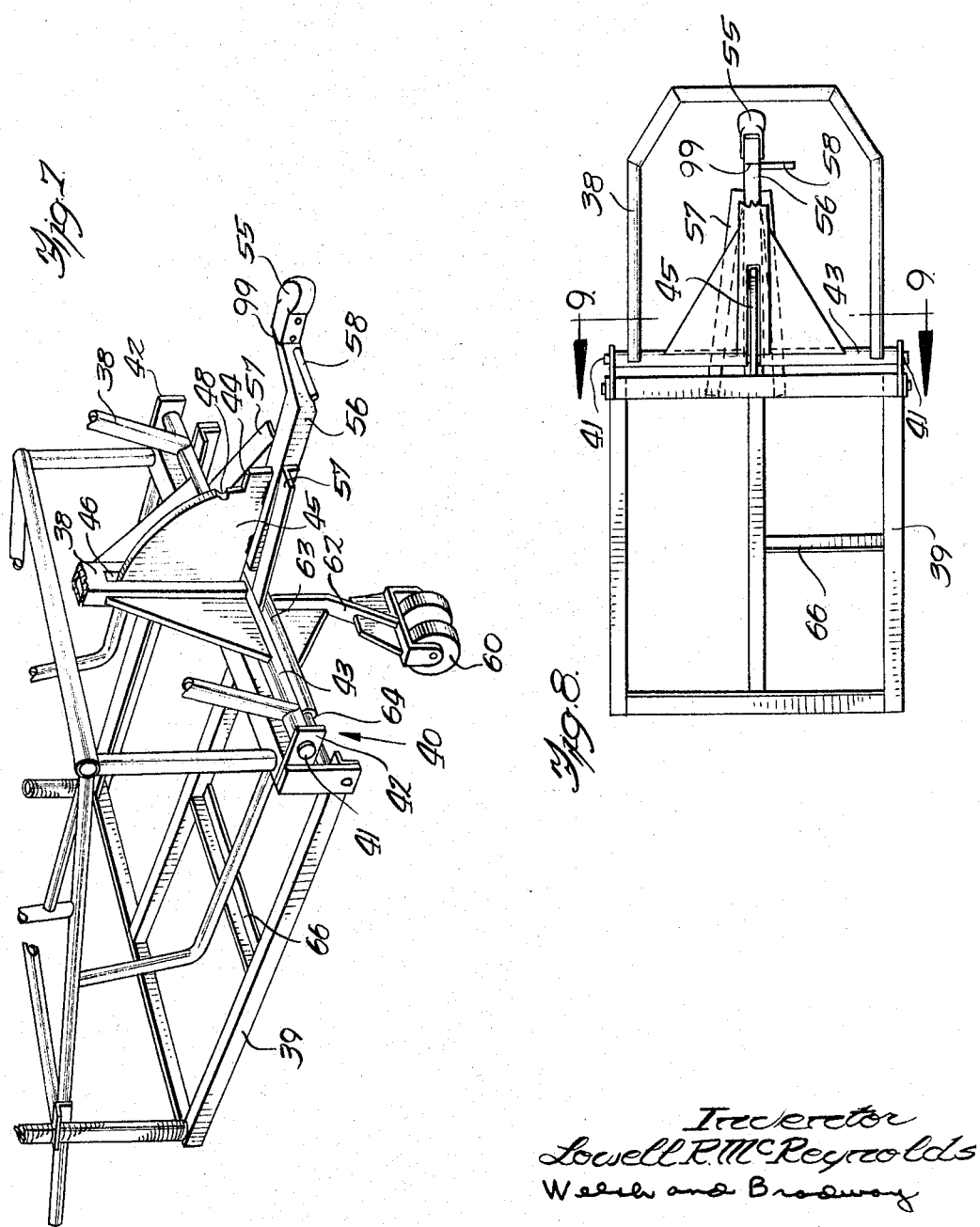
Inventor
Lowell R. McReynolds
Welsh and Bradway
Attorneys

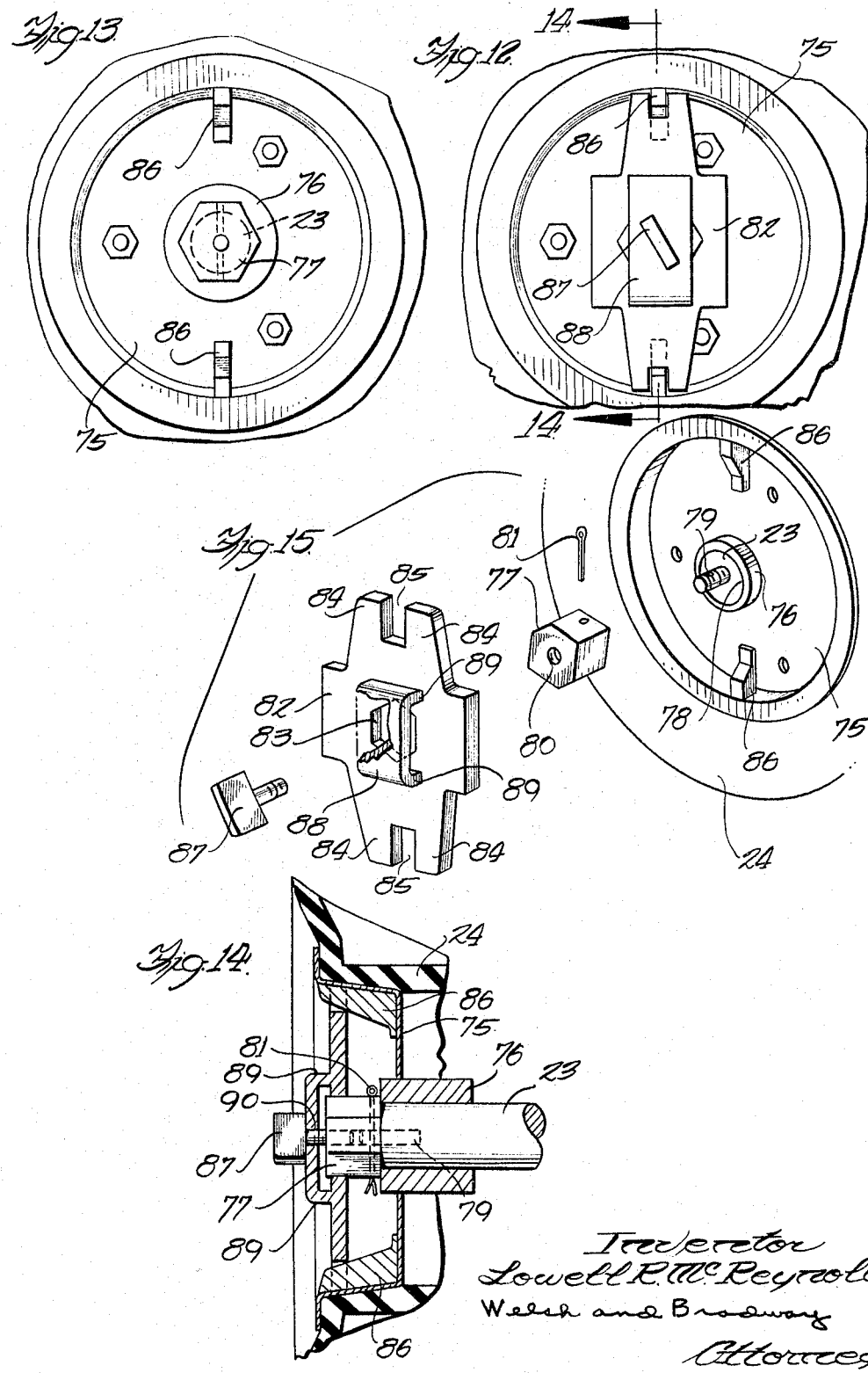

United States Patent Office 3,282,365
Patented Nov. 1, 1966

3,282,365
SELF-PROPELLED GOLF CART
Lowell R. McReynolds, 103 S. Moore St., McLean, Ill.
Filed Mar. 25, 1964, Ser. No. 354,542
11 Claims. (Cl. 180—27)

This invention relates to a self-propelled golf cart and the primary object is to provide a self-propelled golf cart that can be easily and quickly adapted for towing by an automotive vehicle.

Another object is to provide a self-propelled golf cart constructed in two sections which are connected in a novel manner so that one section can be folded relative to the other section.

A more detailed object is to provide a self-propelled golf cart having a guiding wheel that can be folded away from its normal ground engaging position to permit the golf cart to be towed with only its driving wheels in contact with the ground.

A further object is to provide a foldable self-propelled golf cart having locking means which prevents folding of the cart when the foldable section is supported by its wheel and is releasable to allow folding when the cart is tilted to lift the wheel of the foldable section above the supporting surface.

Another object is to provide a self-propelled golf cart having a towing hitch located under a foldable portion of the cart and accessible for attachment to a towing vehicle when such portion is folded.

Still another object is to provide a self-propelled golf cart having a jacking wheel for tilting the cart and elevating a section thereof to facilitate folding of the cart and its attachment to a towing vehicle.

A further object is to provide a self-propelled golf cart having power driven ground engaging wheels that can be made freewheeling to facilitate towing of the cart.

A still further object is to provide a golf cart having driving wheels attached to an axle in a novel manner to facilitate rapid changing of the wheels to and from their freewheeling positions.

Another object is to provide a self-propelled foldable golf cart having a novel steering handle which can be removed from its steering position and used to lock one section of the cart in the folded position.

Another object is to provide a self-propelled golf cart having novel linkages connecting the accelerator and engine and brake pedal and brakes for automatic disconnection and reconnection as the cart is folded and unfolded.

Other objects and advantages of the invention will become apparent from the following description taken in connection with the accompanying drawings in which:

FIGURE 1 is a side elevational view of a cart embodying the novel features of the invention and shown in its operating position;

FIG. 2 is a side elevational view of the cart with its front section elevated prior to folding;

FIG. 3 is a side elevational view of the cart in the folded position;

FIG. 4 is a fragmentary side elevational view showing the cart attached to a towing vehicle;

FIG. 5 is a plan view of the cart with the rear body portion removed to show the operating parts;

FIG. 6 is an enlarged front elevational view of the cart as shown in FIG. 3 with some of the parts broken away for clarity;

FIG. 7 is a perspective view of a portion of the frame of the cart;

FIG. 8 is a reduced plan view of the frame of the cart;

FIG. 9 is an enlarged view taken along line 9—9 of FIG. 8;

FIG. 10 is a fragmentary side elevational view of the frame shown in FIG. 9;

FIG. 11 is a view similar to FIG. 10 but showing the frame of the front section in its folded position;

FIG. 12 is a side elevational view of a driving wheel of the cart shown locked in the drive position;

FIG. 13 is a side elevational view of a driving wheel of the cart shown in its freewheeling position;

FIG. 14 is a cross-sectional view taken along line 14—14 of FIG. 12; and

FIG. 15 is an exploded view of driving wheel and locking member.

The self-propelled golf cart shown in the drawings to illustrate the present invention comprises a body 20 mounted on a frame 21 to which a single guiding wheel 22 and an axle 23 having a pair of driving wheels 24 are attached. A gasoline motor 25 is mounted on the frame and its drive shaft 26 is connected to the rear axle by a suitable drive connection 27. Preferably, the connection includes a clutch of the centrifugal type which engages when the drive shaft of the motor attains a predetermined speed of revolution and automatically disengages when said drive shaft is rotating at less than said predetermined speed. Such an arrangement eliminates the need for any clutch controls for the operator to manipulate.

A combined accelerator and brake pedal 30 moves control rods 31 and 32 which are connected to the engine throttle and brakes. A standard automobile type battery 33 is mounted on the frame 21 for starting the motor 25 and for other purposes to be described later. A generator 34 may be installed in connection with the motor for recharging the battery.

In accordance with one aspect of the invention, the cart is divided longitudinally into two sections which are connected by a hinge in order to permit one section to be folded relative to the other section. While the cart can be divided and the sections connected in various ways, it is desirable for ease of manipulation to divide the cart so that the motor and driving wheels are located in a rear section and the guiding wheel is located in the front section with the front section arranged so that it can be folded relative to the rear section.

In the embodiment shown in the drawings, the cart body 20 is divided into a front section 35 containing a single guiding wheel 22 and a rear section 37 containing the motor 25 and driving wheels 24. The front section of the body is mounted on a front portion 38 of the frame 21 and the rear section is mounted on a rear portion 39 of the frame. To enable the front section of the body to be folded relative to the rear section, the front portion of the frame is hinged to the rear portion of the frame.

The hinge 40 connecting the two portions 38 and 39 of the frame comprises a rod 41 which extends transversely of the body and is secured at opposite ends to arms 42 projecting forwardly from the rear portion of the frame. The hinge is completed by a sleeve 43 attached to the front section of the frame and journaled on the hinge rod to enable the front section frame and body to be rotated about this rod.

The front section frame 38 and body 35 can be rotated about the hinge rod 41 from a first or upper limit position (FIG. 3) where the front section body is folded against and in contact with the rear portion of the body 37 to a second or lower limit position (FIG. 2) where the front section frame engages a stop member 44 on a quadrant plate 45 which is attached to and projects forwardly from the rear body frame 39. Folding of the front section to the upper limit position elevates the front guiding wheel 22 above the surface supporting the cart and allows the cart to be towed with only the rear driving wheels in engagement with the supporting surface. When the front guiding wheel engages the supporting surface, it holds the front portion of the body above the lower limit position and in an intermediate or operating position as shown in FIG. 1.

In order to prevent rotation of the front section 35 of the cart from the operating position to the upper limit position, a releasable locking means is provided. This locking means comprises a portion of the quadrant shaped upstanding plate 45 attached to the rear frame 39 and extending forward of the rear section to be received in a slot 46 cut in the floor 47 and framework 38 of the front section. A detent recess 48 is formed in the quadrant plate to receive a detent arm 49 which is hinged at one end to the floor of the front section. When the front section of the body is in the operating position, the detent arm is engaged in the detent recess to prevent rotation of the front section to the upper limit position.

When the guiding wheel 22 is elevated above the ground, the front section drops to the lower limit position and the detent arm 49 falls free of the detent recess 48 to a position where it can be rotated around its pivot 50 and clear of the quadrant plate as shown in FIG. 2 to allow rotation of the front section to the upper limit position. If the detent arm is not rotated clear of the quadrant plate, it will return to engagement with the detent recess when the front section return to the operating position. Thus, this novel locking means prevents upward rotation of the front section but allows downward rotation and automatically becomes releasable when the front section moves to the lower limit position.

To enable the cart to be connected to a towing vehicle, a trailer hitch 55 is attached to the frame 21 of the cart. This trailer hitch is attached to the cart in a novel manner so that it is covered and concealed when the cart is in its operating position but is exposed and accessible for attachment to a towing vehicle when the cart is folded. To accomplish this result, the hitch is mounted on an arm 56 which is attached to and extends forward of the rear frame 39 and under the front section frame 38 and body 35. Thus, the hitch is concealed by the front section of the body and is inaccessible when the cart is in its unfolded or operating position and is accessible for attachment to a towing vehicle when the front section of the cart is folded against the rear section. The hitch supporting arm is reinforced by angle irons 57 welded to the rear frame. For additional strength, it is also welded to the quadrant plate 45.

With the cart in its normal operating position, the trailer hitch 55 is located behind the guiding wheel 22 and above the bottom of this wheel. When the front section of the cart is rotated to its folded position, the guiding wheel which is attached to the front section is moved above and to the rear of the trailer hitch so that the hitch is accessible for attachment to a towing vehicle. A handle 58 extends from the hitch supporting arm to facilitate maneuvering of the cart into engagement with the hitch on the towing vehicle.

In another aspect of this invention, means is provided to elevate the front section 35 of the cart and the trailer hitch 55 for the dual purpose of moving the locking mechanism to a position where it can be released and elevating the trailer hitch to a position in which it can easily be attached to a towing vehicle after the front section is folded. The novel means comprises a pivotally mounted jacking wheel 60 which is movable selectively to and from a ground-engaging position. While the movement may be effected in various ways, it is accomplished herein by a hydraulic cylinder 61.

The jacking wheel is rotatably mounted at the end of an arm 62 extending from a sleeve 63 which is mounted for rotation about a horizontally aligned, transversely extending rod 64 affixed to the rear frame 39 of the cart below and to the rear of the front section hinge rod 41. A piston rod 65 projecting from the hydraulic cylinder is connected to the jacking arm near the wheel connection. The at-rest position of the jacking wheel is against the underside of the front section 35 as shown in FIG. 1.

The hydraulic cylinder is pivotally connected at its rear to a crossbar 66 of the rear frame 39 and extends forwardly therefrom. When the cylinder is actuated as by an electrically driven pump 67, the piston (not shown) is forced toward the rear of the cylinder and the piston rod 65 is retracted into the cylinder to pull the jacking wheel down and into engagement with the ground. The jacking arm can be rotated from a horizontal position where it fits against the underside of the front portion of the cart through a position where it extends vertically and downwardly to a position where it extends slightly to the rearward and the jacking wheel is in engagement with the ground. The engagement of the jacking wheel with the ground tilts the cart to elevate the front end of the cart as shown in FIG. 2. When the jacking wheel arm reaches rearward limit position shown in FIG. 2, the piston reaches the end of the cylinder to stop the movement of the wheel arm. Because the wheel arm has moved past the vertical to reach this ground-engaging position, the weight of the cart will prevent reverse rotation to its at-rest position.

With the front portion of the cart elevated, the locking mechanism detent 49 moves to a position where it can be moved clear of the detent recess 48 and the cart can now be folded. After the front section is folded against the rear section, the trailer hitch 55 and its handle 58 are accessible and the cart can be moved to the towing vehicle. With the jacking wheel 60 engaging the ground, the weight of the cart is balanced on the drive wheels 24 and the jacking wheel and the cart can readily be rolled in a position for attachment to a towing vehicle. With the cart moved into position behind the towing vehicle, the electric pump 67 is actuated to move the piston rod 65 out of the cylinder 61 and return the jacking wheels to their non-operating position of FIG. 1. As the jacking wheels are returned to their non-operating position, the cart and trailer hitch arm 56 are lowered until the hitch engages the towing knob on the vehicle. Operation of the pump is controlled by a knob 68 located on the front section of the cart.

To facilitate towing of the cart as well as maneuvering of the cart during attachment and detachment from the towing vehicle, the drive wheels 24 are attached to the axle 23 in a novel manner so that they can be easily and quickly changed from a driving engagement with the axle to a freewheeling engagement. To enable the drive wheels to be adjustable in this manner, the wheel rims 75 are equipped with hubs 76 which slip on the axle and can be rotated on the axle. To prevent the wheel rims from sliding off the ends of the axle when in the freewheeling status, a stop member 77 having a diameter greater than the inside diameter 78 of the wheel rim hub is fastened to each end of the axle. In this instance, as shown in FIG. 15, a threaded stub 79 extends rigidly from the axle and engages threads 80 in the stop member. Suitable collars (not shown) are provided on the axle inwardly of and adjacent to each end of the axle to engage and limit inward movement of the wheel rims along the axle. A locking pin 81 preferably is inserted through the stop member and stub to hold the stop member in place.

In addition to preventing the wheel rim 76 from sliding off the axle 23, the stop members 77 also cooperate with yokes 82 to lock the wheels 24 in the drive position. To perform this function, the cross-sections of the stop members must be other than round. In this embodiment, each stop member is of hexagonal cross-section to fit snugly in an opening 83 of similar shape in the yoke. The opening is located in the center of the yoke which is formed from a flat, rectangular piece of metal. Fingers 84 extend from opposite sides of the center section of the yoke to define slots 85 which receive lugs 86 attached to and projecting inwardly from the wheel rims. When the yokes are placed with their openings in engagement with the hexagonal stop members and their fingers clamping the lugs, the wheel rims cannot rotate relative to the axle 23 and, of course, rotation of the axle will cause the wheels to rotate. In order to hold the yoke in engagement with the stop member and lugs, a threaded fastener 87 is provided for each yoke to engage the threaded bore 80 in the center of the stop member. To support the fastener in alignment with the opening in the yoke, a bar 88 having legs 89 at each end is fastened to the yoke to bridge the opening. A hole 90 to receive the fastener is formed in the bar. With this construction, each yoke can be attached to and removed from a driven wheel simply by the installation or removal of a single threaded fastener.

In another aspect of this invention, the cart is provided with a steering handle 36 which is designed so that it can be detached from steering engagement with the guiding wheel 22 and used to hold the front section 35 of the body in the folded position. This handle is made from a generally straight, elongated tube 95 having laterally extending arms 96 in the shape of a loop at one end and a curved portion 97 at the opposite end. The curved portion of the handle terminates in a socket 98 of rectangular cross section which fits over a rectangular shaped head (not shown) at the end of an upright shaft (not shown) pivotally mounted on the frame of the front section and supporting the guiding wheel 22 to enable the wheel to be steered about an upright axis by turning of the handle. The handle is utilized as a locking bar by wedging the socket end against a rearwardly facing inclined wall 99 on the trailer hitch support arm 56 and the loop shaped arms 96 at the opposite end of the handle against the underside of the front section frame 38. The handle is held in this position by a releasable clamp 100 which fits over the loop shaped arms and is held against the front frame by a threaded fastener 101.

In a vehicle of this type, the combination accelerator and brake pedal 30 is connected to the engine throttle and brakes by rods 31 and 32 which extend longitudinally of the vehicle and along the underside of the body and frame. These rods are slidably attached to the underside of the body 20 so that they can move longitudinally relative to the body upon movement of the combination pedal. In the cart, the throttle and brakes are operated upon rearward movement of the rods 31 and 32. The pedal is connected to the rods by linkages arranged so that movement of the pedal in one direction will result in the movement of the accelerator and brake rods in opposite directions to simultaneously increase the speed of the engine and release the brakes.

To accomplish this with one pedal, the throttle rod 31 is connected to the combination pedal by a plunger 105 and a linkage 106 with the linkage arranged to move the throttle rod in a rearward direction to open the throttle upon depression of the accelerator and downward movement of the plunger 105. The broke rod 32 is also connected to the plunger 105 by a linkage 107 which is arranged to urge the brake rod rearwardly when the accelerator is in its raised position and to allow the brake rod to be moved in a forward direction upon depression of the accelerator and plunger 105. A spring 108 is connected to the brake rod to move it forward when the accelerator is depressed.

According to one aspect of this invention, the rods 31 and 32 are arranged in a novel manner so they do not interfere with the folding of the vehicle yet are operative to move longitudinally of the vehicle to operate the throttle and brakes when the cart is in its unfolded and operating position. To accomplish this purpose, the rods are divided respectively into front sections 31a and 32a and rear sections 31b and 32b at the hinge connection between the front and rear portions of the cart. When the cart is in its operating position, the ends of the front sections 31a and 32a of the rods abut the ends of the rear sections 31b and 32b of the rods, respectively, and movement of one section of a rod will be transmitted to its opposite section. Upon folding of the cart, the ends of the rods are moved away from abutting engagement with the ends of the rear sections, but are returned to their engaging positions with the rear sections of the rods when the cart is returned to its operating position.

To compensate for any misalignment between the front and rear sections of the rods, plates 109, which have cross sectional areas several times larger than the cross sectional areas of the rods, are attached to the abutting ends of each section of the rods and extend radially beyond the sides of the rods. The plate attached to one section of a rod will be adjacent the plate on the opposite section when the cart is unfolded so that movement of one section of a rod toward its adjacent section will cause the plates to engage and transfer movement between the sections of the rod.

The golf cart is converted from its golf course operating position to its towing position in the following manner: The knob 68 on the front of the golf cart is turned to actuate the electrically driven hydraulic pump 67 which forces fluid into the cylinder 61 and against the piston to move the piston and rod 65 rearwardly and into the cylinder. This movement of the piston rod pulls the jacking wheel 60 and its arm 62 rearwardly and downwardly about its pivot rod 64. As the jacking wheel engages the ground, the front portion 35 of the golf cart and its guiding wheel 22 are raised off the ground. The pump is operated until the jacking wheel reaches its rearward limit position where the piston is stopped by contact with the end wall of the hydraulic cylinder. With the jacking wheel in its ground-engaging position, the front section of the cart and its guiding wheel are elevated above the ground. The elevation of the guiding wheel above the ground allows the front section of the cart to drop to the lower limit position and releases the detent arm 49 from engagement with the detent recess 48. The detent arm can then be rotated about its pivot pin 50 and clear of the detent recess to permit the front section to be folded about its hinge rod 41 relative to the rear section.

With the front section 35 elevated, the steering handle 36 is removed from engagement with the head of the front guiding wheel shaft. The front section can then be folded until it contacts the rear section. The steering handle is then positioned with its socket end 98 contacting the rearward facing wall 99 on the trailer hitch and its loop shaped arms 96 engaging the frame of the front body section (FIG. 4). The steering handle clamp 100 is used to hold the steering handle against the front section frame to lock the front section in the folded position.

To disconnect the rear wheels 24 from locking engagement with the rear axle 23 and permit them to freely rotate about the axle, the locking yoke 82 is removed from each wheel. This can be done simply by unscrewing the threaded fastener 87 which extends through the yoke and is threaded into the stop member 77 locked on the end of the axle.

With the front section 35 locked in the folded position and the rear wheels 24 free to rotate about the axle 23, the cart is ready to be moved by the handle 58 which is attached to the trailer hitch 55. By means of this handle, the cart can be moved into position against the rear of the towing vehicle. With the cart positioned adjacent to the towing vehicle, the pump 67 is again actuated to move the jacking wheel 60 and its arm 62 forward and upward to its normal horizontal position. This lowers the cart until the trailer hitch 55 engages the towing hitch of the automobile. The forward rotation of the jacking wheel is continued until it is back to its normal at-rest position. Then the trailer is ready to be towed by its towing vehicle.

When the cart has been towed to its point of use, it can be placed in service simply by reversing the procedures described for folding.

I claim:

1. A self-propelled vehicle including a body divided into first and second sections and connected by a transversely extending hinge with each section having at least one ground-engaging wheel, a trailer hitch positioned under said first section and rigid with said second section, said first section being rotatable about said hinge connection from an operating position wherein the first section fits over the trailer hitch to a second or folded position wherein the trailer hitch is uncovered and accessible, and releasable locking means holding said first section selectively in the operating position and in the folded position.

2. A self-propelled vehicle including a body divided into first and second section and connected by a transversely extending hinge with each section having at least one ground engaging wheel, a trailer hitch positioned under said first section and rigid with said second section, said first section being rotatable about said hinge connection from an operating position wherein the first section fits over the trailer hitch and the first section ground engaging wheel extends below the trailer hitch to a folded position wherein the trailer hitch is uncovered and accessible and said first section ground engaging wheel is positioned above the trailer hitch, a jacking wheel attached to the vehicle and movable into engagement with the ground to tilt the vehicle and raise the trailer hitch and first section, and releasable locking means to hold said first section and selectively in the operating position and in the folded position.

3. A self-propelled vehicle having a body divided into first and second sections and connected by a transversely extending hinge, at least one ground engaging guiding wheel attached to said first section, ground engaging drive wheels mounted for rotation about a power driven axle on said second section, said ground engaging drive wheels being selectively lockable to said axle for rotation therewith, a trailer hitch positioned under said first section and projecting rigidly from said second section, said first section being rotatable about said hinge connection from an operating position wherein the first section fits over the trailer hitch to a folded position wherein the trailer hitch is uncovered and accessible, and releasable locking means to hold said first section selectively in the operating position and in folded position.

4. A self-propelled vehicle including a body divided into first and second sections and connected by a transversely extending hinge with each section having at least one ground engaging wheel, a throttle controlled motor positioned in said second section, a foot operated pedal located in said first section, a connection between said throttle and said foot pedal, said connection including a rod extending longitudinally of said vehicle and adapted to slide endwise in opposite directions to open and close the throttle upon movement of the foot pedal in different directions, a trailer hitch positioned under said first section and projecting rigidly from said second section, said first section being rotatable about said hinge connection from an operating position wherein the first section covers and conceals the trailer hitch to a folded position wherein the trailer hitch in uncovered and accessible, said throttle rod being divided at said hinge connection into front and rear portions aligned with and abutting each other to transmit motion of one portion of the rod to the other portion when said first section is in said operating position and being separable from each other as an incident to movement of said first section to said folded position, releasable locking means to hold said first section selectively in the operating position and in the folded position.

5. A self-propelled vehicle including a body divided into first and second sections and connected by a transversely extending hinge, a guiding wheel mounted on the lower end of an upright shaft journaled in said first section, drive wheels attached to said second section, a steering handle removably connected to said guiding wheel shaft and comprising an elongated tubular rod, a trailer hitch positioned under said first section on a support attached to and projecting from said second section, said first section being rotatable about said hinge connection from an operating position wherein the first section fits over the trailer hitch to a folded position wherein the trailer hitch is uncovered and accessible, a rearwardly facing stop affixed to said trailer hitch support, a releasable clamp mounted on the underside of said first section of said body, said steering handle being positioned with one end portion engaging said rearwardly facing stop and another portion held in contact with the underside of the first section by said releasable clamp to lock said first section in the folded position, and releasable locking means to hold said first section in the operating position.

6. A self-propelled vehicle having wheels which are engageable with a supporting surface, a body divided into first and second sections and connected by a transversely extending hinge, a trailer hitch positioned under said first section and projecting rigidly from said second section, said first section being rotatable about the hinge connection from an upper or folded position through an intermediate or operating position to a lower limit position, at least one wheel depending from said first section to hold said section above said lower limit position upon engagement with said supporting surface, releasable locking means to prevent rotation of the first section from the operating position to the folded position, a jacking wheel attached to said vehicle and movable into engagement with the supporting surface to tilt the vehicle and elevate said first section and said depending wheel above the supporting surface to permit said first section to drop to said lower limit position, said operating position locking means being releasable when said first section is in said lower limit position, and additional releasable locking means to hold the first section in said folded position.

7. A self-propelled vehicle of the type described in claim 6 in which said rotation locking means comprises a quadrant-shaped ratchet plate affixed to said second section and having at least one recess to receive a pawl, a pawl pivotally attached to said first section and insertable in one of said recesses when the first section is in the operating position to engage said plate to prevent upward rotation of the first section relative to the plate and second section, said pawl being positioned to clear said recess upon movement of said first section to said lower limit position and be free to be rotated about said pivot away from said plate.

8. A self-propelled vehicle having a body divided into a first section having at least one ground engaging guiding wheel and a second section having ground engaging driving wheels mounted for rotation about a power driven axle connected to said second section, said driving wheels being selectively lockable to said axle for rotation therewith, a hinge extending transversely of said body and connecting said first and second sections to permit said first section to be rotated about the hinge connection from an upper or folded position through an intermediate or operating position to a lower limit position, said guiding wheel depending from said first section to engage the ground when the first section is in said operating position and hold the first section above said lower limit position, a trailer positioned under said first section and projecting rigidly from said second section, releasable locking means to prevent rotation of the first section from the operating position to the folded position, a jacking wheel attached to the vehicle and engageable with the ground to tilt the vehicle and elevate said first section and its guiding wheel above the ground to permit said first section to move into said lower limit position, said operating position locking means being releasable when said first section is in the lower limit position, and additional releasable locking means to hold the first section in said folded position.

9. A self-propelled vehicle including a body divided into a first section having at least one ground engaging guiding wheel and a second section having two ground engaging drive wheels, a hinge extending transversely of said body and connecting said first and second sections to permit said first section to be rotated about the hinge connection from an upper or folded position through an intermediate or operating position to a lower limit position, said guiding wheel depending from said first section to engage the ground when the first section is in the operating position and hold the first section above said lower limit position, a throttle controlled motor positioned in said second position, a foot operated pedal located in said first section, a rod extending longitudinally of said vehicle between said throttle and said foot pedal and adapted to slide in opposite directions to open and close the throttle in response to movement of the foot pedal, said throttle rod being divided at said hinge connection into front and rear portions aligned and abutting with each other upon sliding movement of the rod to transmit motion of one portion of the rod to the other portion, a trailer hitch positioned under said first section and projecting rigidly from said second section, first releasable locking means to prevent rotation of the first section from the operating position to the folded position, a jacking wheel attached to the vehicle and engageable with the ground to tilt the vehicle and elevate said first section and its guiding wheel above the ground to permit said first section to move into said lower limit position, said first locking means being releasable when said first section is in the lower limit position, and additional releasable locking means to hold the first section in said folded position.

10. A self-propelled vehicle including a body divided into first and second sections and connected by a transversely extending hinge, a guiding wheel mounted on the lower end of an upright shaft journaled in said first section, drive wheels supporting said second section, a steering handle removably connected to said guiding wheel shaft and comprising an elongated tubular rod, said first section being rotatable about the hinge connection from an upper or folded position through an intermediate or operating position to a lower limit position, said guiding wheel depending from said first section to engage the ground when the first section is in the operating position and hold the first section above said lower limit position, a trailer hitch positioned under said first section and rigid with said second section, releaseable locking means to prevent rotation of the first section from the operating position to the folded position, said first section being held in the folded position by engagement of the one portion of said steering handle with the trailer hitch support and another portion of the handle against the underside of said front section, clamping means attached to said underside to hold said handle in said engagement, and a jacking wheel attached to the vehicle and engageable with the ground to tilt the vehicle and elevate said first section and its guiding wheel above the ground to permit said first section to move into said lower limit position, said locking means being releasable when said first section is in the lower limit position.

11. A self-propelled vehicle having a body divided into first and second sections and connected by a transversely extending hinge, at least one ground engaging guiding wheel attached to said first section, at least one ground engaging drive wheel mounted on a power driven axle on said second section and rotatable about said axle, said ground engaging drive wheel being selectively lockable to said axle for rotation therewith, a trailer hitch positioned under said first section and projecting rigidly from said second section, said first section being rotatable about said hinge connection from an operating position wherein the first section fits over the trailer hitch to a folded position wherein the trailer hitch is uncovered and accessible, a jacking wheel attached to the vehicle and movable into engagement with the ground to tilt the vehicle and raise the trailer hitch, and releasable locking means to hold said first section selectively in the operating position and in the folded position.

References Cited by the Examiner

UNITED STATES PATENTS

| | | | |
|---|---|---|---|
| 232,926 | 10/1880 | Berkholz | 192—67 |
| 1,925,020 | 8/1933 | Young | 280—478 X |
| 2,094,399 | 9/1937 | Fuchs | 180—14 X |
| 2,536,749 | 1/1951 | Jenner et al. | 180—25 |
| 2,668,597 | 2/1954 | King | 180—75 |
| 2,863,517 | 12/1958 | Mitchell | 180—75 |
| 2,910,130 | 10/1959 | Schlaphoff | 180—33 |
| 3,017,207 | 1/1962 | Lloyd | 287—53 |
| 3,161,172 | 12/1964 | Kassbohrer | 180—14 X |
| 3,170,715 | 2/1965 | Johnson | 280—402 |
| 3,174,574 | 3/1965 | Mason | 180—25 |
| 3,184,985 | 5/1965 | Drietzler | 180—75 X |

KENNETH H. BETTS, *Primary Examiner.*